United States Patent Office 3,008,431
Patented Nov. 14, 1961

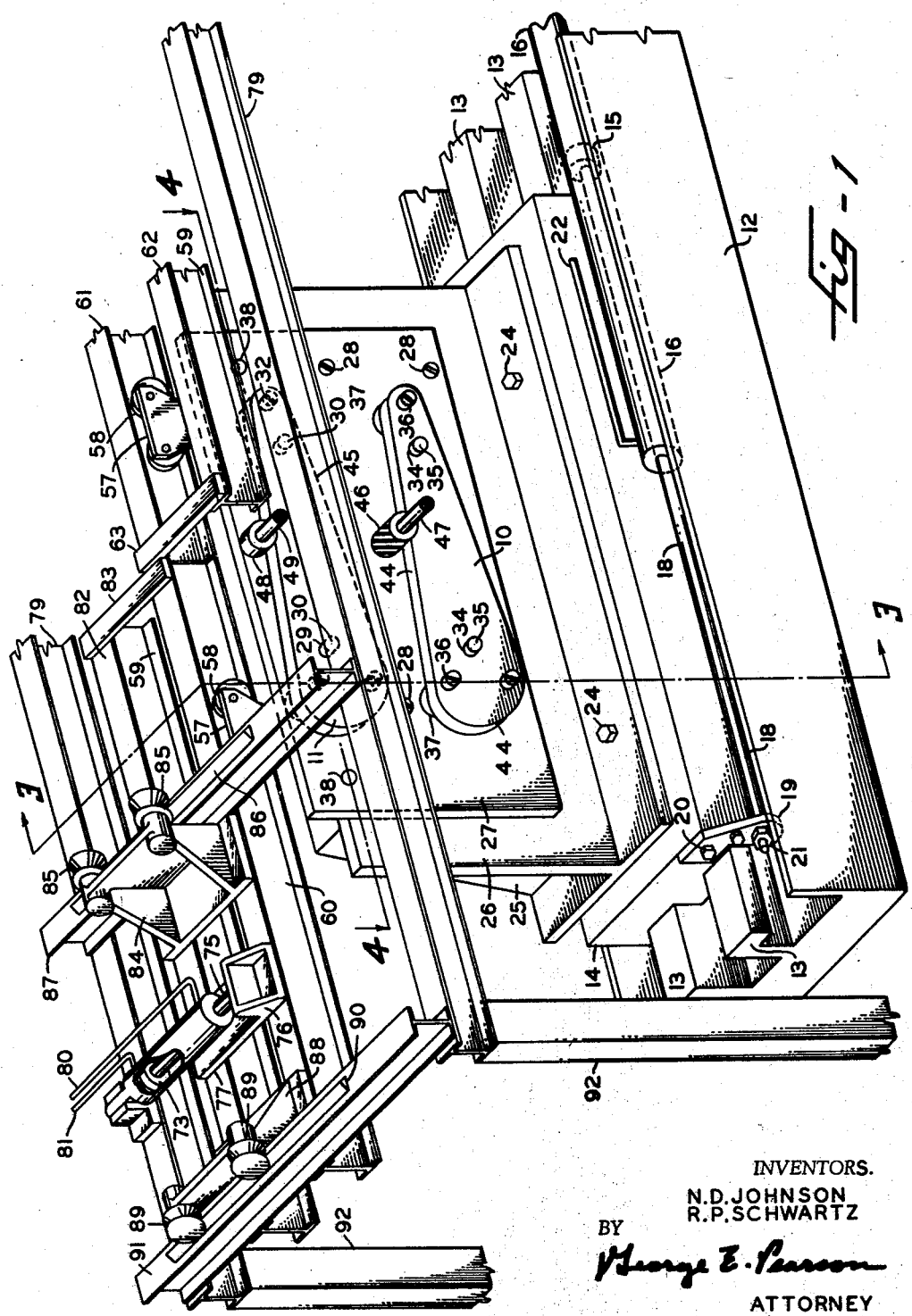

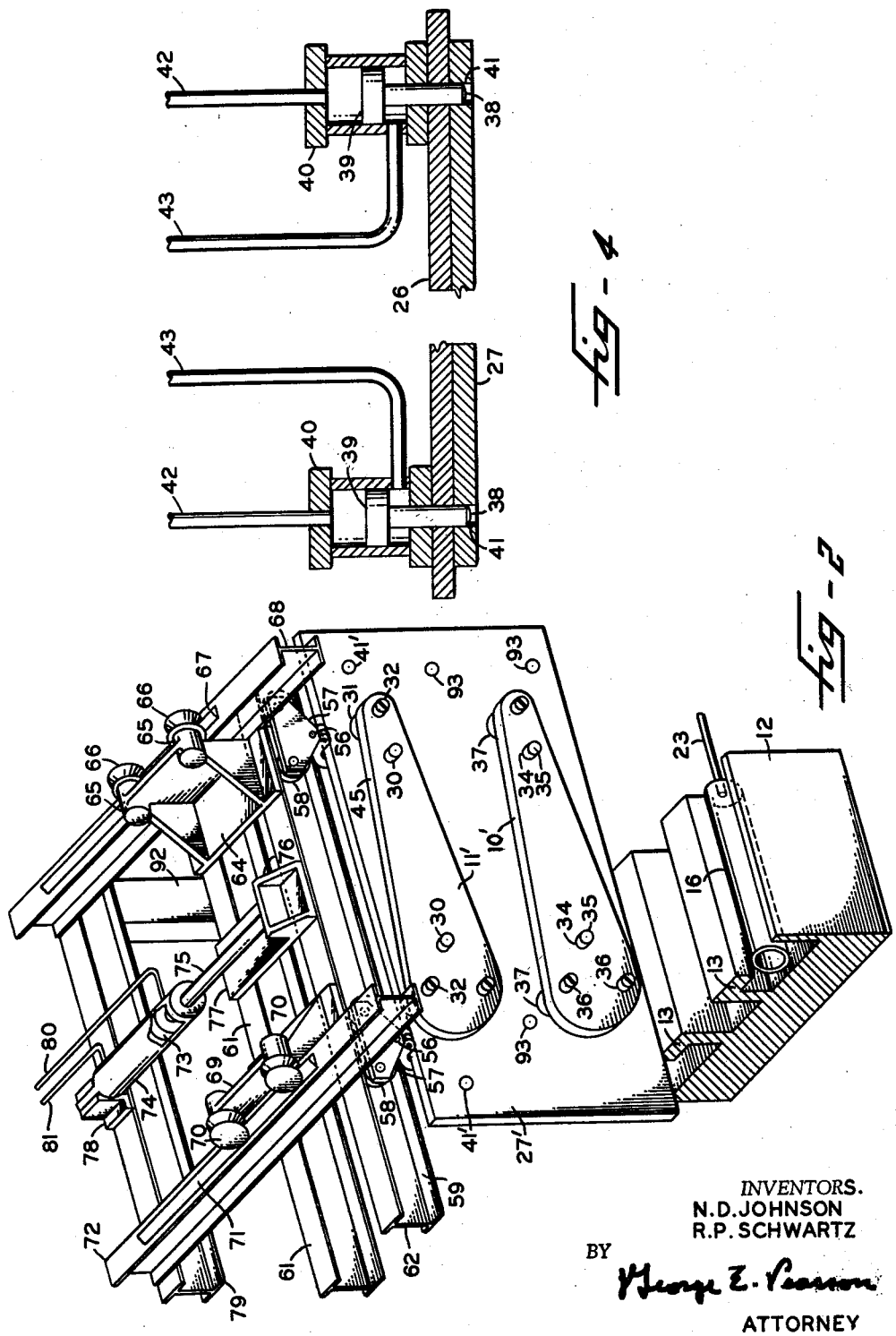

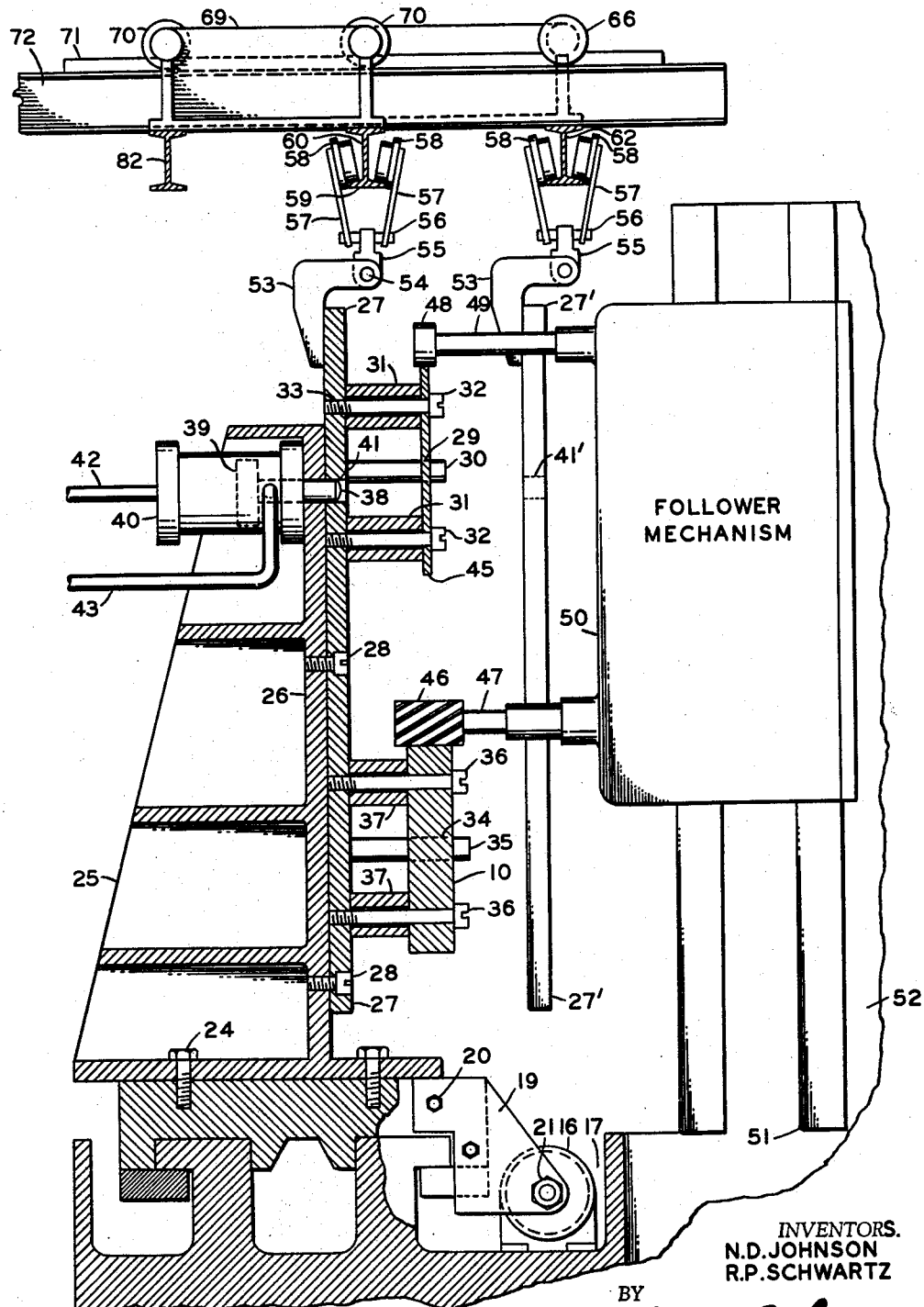

3,008,431
FIXTURE TRANSFER MECHANISM
Norman D. Johnson and Robert P. Schwartz, Chula Vista, Calif., assignors to Rohr Aircraft Corporation, Chula Vista, Calif., a corporation of California
Filed May 13, 1959, Ser. No. 812,961
6 Claims. (Cl. 104—98)

This invention relates generally to a conveyor system for transporting a unitary fixture comprising a workpiece and template to a cutting machine having a rotary cutter which cuts a face on the workpiece the same shape as the face of the template.

More specifically, the present invention is directed to a fixture transfer mechanism including a system of overhead switching tracks and roller supports for transferring successive fixtures to and from a work station, the arrangement being such that the removal and replacement of a finished workpiece may be accomplished concurrently with the work operations being performed on the workpiece at the work station.

The fixture transfer mechanism of the present invention is disclosed but not claimed in Patent No. 2,883,912 for Conveyor for Workpiece and Template which is assigned to the assignee of the instant invention.

An object of the invention is to provide a new and improved overhead track switching system for moving work fixtures depended therefrom to and from a work station in directions selectively along and transversely of the tracks.

Another object of the invention is to provide a fixture transfer mechanism for two workpiece and template supporting fixtures whereby while the workpiece on one fixture is being cut, the finished workpiece may be removed from the other and replaced by one which has to be cut to the shape of its template.

Another object is to provide for the suspension of each template and workpiece fixture on rollers which may easily be rolled along an overhead track by the operator to remove a finished workpiece from the machine and to transfer an unfinished one thereto.

Further objects will become apparent as a description of the conveyor system proceeds. For a better understanding of the invention reference is made to the accompanying drawing, in which:

FIGS. 1 and 2 are a view in isometric projection of the conveyor system with some supports omitted and portions of a milling machine;

FIG. 3 is a view partly in section on line 3—3 of FIG. 1 showing portions of the machine and conveyor and, FIG. 4 is a sectional view on line 4—4 of FIG. 1 showing portions of the machine.

The conveyor shown is for transferring a workpiece 10 and template 11 to and from a milling machine having a long base 12 provided with horizontal guideways 13 along which a table 14 is reciprocated by any suitable drive means. The means shown comprises a piston 15 slidable in a stationary cylinder 16 mounted in an open space 17 provided in the top of base 12. The piston is attached to one end of piston rod 18 whose other end passes through a bracket 19 attached by a set of bolts 20 to one end of table 14. The end of piston rod 18 is threaded and a nut 21 screwed thereon secures the piston rod to bracket 19. A pipe 22 connected to one end of the cylinder supplies pressure fluid thereto to slide the piston 15 in one direction and a pipe 23 connected to the opposite end of the cylinder supplies pressure fluid to slide the piston in the opposite direction. Suitable valves (not shown) which do not form part of the present invention, controlled by template 11 control the admission and discharge of pressure fluid into and out of pipes 22 and 23. Secured to the top of table 14 by bolts 24 is a large support 25 whose front consists of a vertical plate 26 constituting a work supporting table of large area. A fixture 27 in the form of a large plate supports the workpiece 10 and template 11, plate 27 being secured to the front of table 26 by any suitable quickly detachable means such as the screws 28.

Indexing means are provided to assure the securing of template 11 and workpiece 10 to fixture 27 at predetermined positions thereon, the indexing means for template 11 consisting of two circular holes 29 through the template adapted to snugly receive the front ends of two cylindrical pins 30 whose rear ends extend into and are tightly secured to fixture 27. The template 11 is preferably spaced from fixture 27 by a plurality of similar sleeves 31 through which pass the headed bolts 32 whose threaded rear ends are screwed into threaded holes 33 in fixture 27. Similarly workpiece 10 is provided with two circular holes 34 which snugly receive the front ends of the cylindrical pins 35 whose rear ends are attached to fixture 27. Headed bolts 36 secure the workpiece in position and the sleeves 37 keep it spaced from the front face of fixture 27.

Indexing means are also provided to locate fixture 27 at a predetermined position on plate 26, that illustrated comprising a pair of cylindrical locating pins 38 attached to pistons 39 slidable in the cylinders 40. The front ends of pins 38 are a sliding fit in a pair of circular bores 41 in the fixture 27. Cylinders 40 (FIG. 4) are attached to the rear of plate 26 near the top thereof and the pistons 39 may be simultaneously moved forward by admitting pressurized fluid to pipes 42 from a source (not shown) and moved rearward to withdraw the pins 38 from the bores 41 by admitting pressurized fluid to pipe 43. At their extreme front ends the pins 38 taper in as shown to facilitate their entry into the bores 41.

To cut the peripheral face 44 of workpiece 10 to the same shape and size as the peripheral face 45 of template 11, a rotary milling cutter 46 secured to the end of shaft 47 cuts excess metal from the edge of the workpiece, the up and down movement of cutter 46 being controlled by a cylindrical rotary metal tracer 48 which rides along the peripheral face 45 of template 11 as table 14 is reciprocated by piston 15. Tracer 48 is secured to the end of a shaft 49 which is rotatably mounted in a carriage 50 slidable along a vertical guideway 51 formed on a pillar 52 secured to machine base 12. The follower or control mechanism which causes carriage 50 to follow the up and down movement of tracer 48 may be of any known type (not shown), also the electric motor drive for shaft 47 is not shown, not being part of this invention. From the above it will be clear that after the tracer has moved around the entire peripheral face 45 of template 11, the cutter 46 will have cut excess material from the edge of workpiece 10 to leave a substantially smooth peripheral face 44 which is of the same size and shape as template face 45.

A conveyor is provided to transfer the template 11 and workpiece 10 to and from the machine, the conveyor comprising a pair of arms 53 which are attached to the top of fixture 27, each arm depending from a pivot pin 54 attached to the lower portion of a block 55. The upper portion of block 55 has a pivot pin 56 the ends of which enter holes provided in the lower ends of a pair of similar plates 57. Pivotally supported at the top of each plate 57 are a pair of rollers 58 adapted to roll along the bottom flanges 59 of the aligned I beams 60, 61. A third I beam 62 the same size as beam 61 is connected parallel to the latter at one end by a plate 63 welded to the beams and the beams are connected at their opposite ends by a bracket 64. The upper end of bracket 64 is provided with a pair of bearings 65 which receive the pivotal supports of a pair of rollers 66 which are adapted to roll along a straight track 67 secured to the top of stationary I beam 68. A second bracket 69 connects the top flanges of beams 61, 62, this bracket having bearings pivotally supporting the rollers 70 adapted to roll along a track 71 which is at the same level as track 67 and parallel thereto. Track 71 is attached to the top of fixed I beam 72 and beams 61, 62 may be moved in a direction transverse to their length by a piston 73 slidable in a cylinder 74. The piston is attached to one end of a piston rod 75, the other end of which is attached to a bracket 76 attached to a plate 77 connecting the beams 61, 62 together. The rear end of cylinder 74 is secured to a bracket 78 which rests on and is fastened to a long fixed I beam 79. Pressurized fluid is supplied to the front end of cylinder 74 by pipe 80 from a suitable source (not shown) or to the rear end of the cylinder by a pipe 81.

Fastened to beam 60 at the rear thereof is an I beam 82 the same size as beam 60 and lying parallel thereto, a plate 83 connecting one end of these beams. A bracket 84 also connects the beams 60, 82, this bracket pivotally supporting a pair of rollers 85 adapted to roll along a track 86 parallel to track 71. Track 86 is secured to the top of an I beam 87 whose rear end rests on and is secured to beam 79. Beams 60 and 82 are also connected by a bracket 88 on which the rollers 89 are pivotally supported, the rollers resting on a track 90 which is parallel to track 86. Track 90 is secured to the top of I beam 91 whose front and rear ends rest on and are secured to front and rear beams 79. The ends of each of beams 79 rest on a pair of supporting columns 92 whose lower ends (not shown) rest on the floor. The front ends of beams 68, 72, 87 and 91 all similarly rest on and are secured to the top of a stationary supporting I beam 79. Beams 60 and 82 are moved forwardly or rearwardly by a second piston 73 and associated parts having the same reference numbers as the similar parts previously described for moving the beams 61—62.

While the workpiece 10 is machined in the manner above described, it and its supporting fixture 27 are being moved behind a second fixture 27' the same shape and size as fixture 27 and having a pair of circular indexing bores 41' similar to and spaced apart the same as the bores 41 in fixture 27. Fixture 27' is supported on beam 62 by a second set of rollers 58 and associated supporting members identical to those previously described for supporting fixture 27. A template 11' the same shape and size as template 11 is attached to fixture 27' by securing means similar to those used for attaching template 11 to fixture 27 and locating pins 30 assure the proper positioning of template 11' on its supporting fixture. While the workpiece 10 is being machined, the operator can attach a second workpiece 10' to fixture 27' by parts similar to those used for attaching workpiece 10 in position. Workpiece 10' is substantially the same shape and size as workpiece 10 before machining and has cylindrical holes 34 to receive the cylindrical locating pins 35 projecting from fixture 27'. After the operator slides workpiece 10' rearwardly along the pins 35, he inserts and tightens the bolts 36 to secure it to fixture 27' in the same position relative to template 11' as the workpiece 10 (before machining) has to template 11.

When the machining of workpiece 10 is complete, the machine is stopped and fixture 27 having workpiece 10 and template 11 thereon is removed from the machine and fixture 27 having workpiece 10' and template 11' thereon is placed on the machine. This is accomplished by removing the screws 28 and supplying pressurized fluid through pipes 43 to move the pistons 39 rearwardly and thus withdraw the pins 38 from bores 41. Fixture 27 with workpiece 10 and template 11 attached thereto is now moved to the left in FIG. 1, the rollers 58 running along flanges 59 of beams 60 and 61 and supporting the weight of all the parts suspended therefrom. When all these rollers are on beam 60 and the right hand end of fixture 27 is clear of the left hand of plate 26, pressurized fluid is supplied by pipe 81 to the rear of piston 73 to move the beams 60 and 82 forward. The rollers 85 and 89 roll along tracks 86 and 90, supporting the entire weight of these beams and fixture 27 until the right hand end of beam 82 is opposite the left hand end of beam 61. The beams 61 and 62 are then moved rearwardly until the left hand end of beam 62 is opposite the right hand end of beam 82. This is accomplished by admitting pressurized fluid to cylinder 74 of FIG. 2 from pipe 80. Fixture 27' is then pushed toward the left, its weight first being carried by beam 62 and then by beams 62 and 82 as rollers 58 roll along these beams. The fixture is stopped when its bores 41' are in front of indexing pins 38. Pressurized fluid is then supplied to pipes 42 to move the pins and pistons 39 forward, the pins 38 entering the bores 41' and locating fixture 27' at a predetermined position on table 26. Screws 28 are next inserted in the holes 93 in fixture 27 and tightened to fasten fixture 27' to table 26. The machine is now started, the tracer 48 moving along the peripheral face 45 of template 11' and causing the cutter 46 to cut the face 44 of workpiece 10' to the same contour. While this cutting is proceeding, portions of template 11' and workpiece 10' are moving behind fixture 27 so that the operator can remove finished workpiece 10 and replace it by another to be cut to size while the machining of workpiece 10' is proceeding.

When the machining on workpiece 10' is complete, the machine is stopped and fixture 27' is released from plate 26 by removing screws 28 and withdrawing pins 38 from bores 41'. Fixture 27' with workpiece 10' and template 11' is then moved to the right, the rollers 58 running along flanges 59 of beams 82 and 62. When all of these rollers are on beam 62 and the left hand end of fixture 27' is clear of the right hand end of plate 26, pressurized fluid is supplied by pipe 80 to the front of piston 73 to move the beams 60 and 82 rearward until the right hand end of beam 60 is opposite the left hand end of beam 62. The beams 61 and 62 are then moved forwardly until the left hand end of beam 61 is opposite the right hand end of beam 60, this being accomplished by admitting pressurized fluid to cylinder 74 of FIG. 2 from pipe 81. Fixture 27 with the new workpiece 10 mounted thereon is then pushed toward the right, its weight first being carried by beam 60 and then by beams 60 and 61 as rollers 58 roll along these beams. The fixture is stopped when its bores 41 are in front of indexing pins 38 which are then advanced, as before, to enter the bores 41 to again locate fixture 27 in its initially described position on table 26, screw 28 being then inserted to secure the fixture in this position on the table. This then completes a full cycle of fixture transfer operations, and the machine may now be started to begin cutting operations on the new workpiece 10 mounted on fixture 27, finished workpiece 10' being removed from fixture 27' concurrently with these cutting operations on the new workpiece.

From the above it is clear that the conveyor system effects a substantial saving in the operator's time and permits a greater number of workpieces to be machined in a given time than if a second fixture and template were not provided.

This invention may be embodied in other forms or carried out in other ways without departing from the spirit or essential characteristics thereof. The present embodiment of the invention is therefore to be considered as in all respects illustrative and not restrictive, the scope of the invention being indicated by the appended claims, and all changes which come within the meaning and range of equivalency of the claims are intended to be embraced therein.

Having thus described the invention, what we claim as new and useful and desire to secure by Letters Patent is:

1. A fixture transfer mechanism comprising a framework including a plurality of fixed overhead tracks arranged in spaced parallel relation, first and second pairs of spaced parallel tracks arranged generally in end to end relationship and extended transversely of said fixed tracks, means carried by the first pair of said first and second pairs of tracks and including roller supports engageable with one pair of said fixed tracks for moving said first pair of tracks as a unit therealong into alignment selectively with one or both tracks of the second pair of said first and second pairs of tracks, means carried by said second pair of tracks and including roller supports engageable with another pair of said fixed tracks for moving said second pair of tracks as a unit therealong into alignment selectively with one or both tracks of said first pair of tracks, means supported on said framework and individual to each of said first and second pairs of tracks for moving the same along said fixed tracks, a pair of vertically disposed workpiece supporting fixtures, and means including roller supports individual to each of said pair of fixtures and engageable with one of said movable tracks or selectively with both tracks of an aligned pair of said movable tracks for suspending said fixtures therefrom for movement therealong.

2. A fixture transfer mechanism comprising, in combination: a first vertical fixture; a pair of spaced apart arms connected to said fixture and extending upwardly therefrom; rollers pivotally mounted on the upper ends of said links; first and second aligned overhead straight tracks along which said rollers are adapted to roll; a third track connected to and in front of said second track and parallel thereto; a fourth track connected to and in back of said first track and parallel thereto, means for aligning said third and fourth tracks in said position of alignment occupied by said first and second tracks and simultaneously moving said first and second tracks from said position after moving said rollers onto said first track; a pair of spaced apart rollers adapted to roll along said third track and along said third and fourth tracks when the same are aligned; a second fixture; and a second pair of spaced apart arms depending from said rolls and connected to said second fixture.

3. A fixture transfer mechanism comprising; first and second spaced apart overhead tracks; means securing said tracks together in parallel relation; means supporting said tracks for movement transversely of the tracks in a substantially horizontal plane; a first fixture disposed beneath said first track; a plurality of spaced apart rollers resting on said first track; arms depending from said rollers and having their lower ends attached to the top of said fixture; third and fourth spaced apart overhead tracks parallel to said first and second tracks; means connecting said third and fourth tracks together; means movably supporting said third and fourth tracks for movement transversely of the tracks in said horizontal plane; spaced apart rollers resting on said fourth track; arms depending from said rollers; and a second fixture disposed beneath said fourth track and having its upper end connected to the lower ends of said arms, said first and second tracks and said third and fourth tracks being movable selectively to bring one end of said third track directly opposite one end of said first track to permit at least one of said rollers to roll along said third track and to bring one end of said fourth track directly opposite one end of said second track to permit at least one of said rollers to roll along said second track.

4. A fixture transfer mechanism as claimed in claim 3, in which the rear face of the second fixture lies in a plane spaced from the front of said first fixture when said first fixture is advanced behind said second fixture in response to the rolling of said rollers onto said third track.

5. A fixture transfer mechanism as claimed in claim 3, in which the spacing between said first and second tracks is the same as that between said third and fourth tracks whereby a forward movement of said first and second tracks and an equal rearward movement of said third and fourth tracks brings said second and fourth tracks into alignment with each other.

6. A fixture transfer mechanism as claimed in claim 3, in which fluid operated means is constructed and arranged to reciprocate said first and second tracks transversely of their length; and a second fluid operated means is constructed and arranged to reciprocate said third and fourth tracks transversely of their length.

References Cited in the file of this patent

UNITED STATES PATENTS 2,883,912     Billman et al.             Apr. 28, 1959